US012674418B2

(12) United States Patent
Clark et al.

(10) Patent No.: US 12,674,418 B2
(45) Date of Patent: Jul. 7, 2026

(54) ACTIVE THERMAL MANAGEMENT OF FUEL SYSTEMS AND FUEL NOZZLES FOR MORE ELECTRIC ENGINES

(71) Applicant: RTX Corporation, Farmington, CT (US)

(72) Inventors: Thomas Clark, Wells, ME (US);
Murat Yazici, Glastonbury, CT (US);
Andrew Breault, Bolton, CT (US);
Jeffrey Morton, Manchester, CT (US);
John Akin, Charlotte, NC (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/829,187

(22) Filed: Sep. 9, 2024

(65) Prior Publication Data

US 2026/0071572 A1 Mar. 12, 2026

(51) Int. Cl.
| | |
|---|---|
| *F02C 7/18* | (2006.01) |
| *F01D 15/08* | (2006.01) |
| *F02C 9/18* | (2006.01) |

(52) U.S. Cl.
CPC ............... *F02C 7/18* (2013.01); *F01D 15/08* (2013.01); *F02C 9/18* (2013.01)

(58) Field of Classification Search
CPC .................................... F02C 9/18; F02C 7/18
See application file for complete search history.

(56) References Cited

U.S. PATENT DOCUMENTS

| | | | |
|---|---|---|---|
| 10,739,005 | B2 | 8/2020 | Kironn et al. |
| 11,047,306 | B1 | 6/2021 | Millhaem et al. |
| 11,846,422 | B2 | 12/2023 | Ryon et al. |
| 11,913,376 | B2 | 2/2024 | Shinde et al. |
| 12,372,029 | B1* | 7/2025 | Miller ...................... F02C 7/18 |
| 2015/0275758 | A1* | 10/2015 | Foutch ................... F02C 7/047 |
| | | | 60/785 |
| 2017/0191420 | A1* | 7/2017 | Clarke ................. F01D 17/145 |
| 2018/0128179 | A1* | 5/2018 | Staubach ................. F02C 3/04 |
| 2020/0158024 | A1* | 5/2020 | Schofield ................. F02C 9/18 |
| 2022/0252011 | A1* | 8/2022 | Rambo ..................... F02C 9/18 |
| 2023/0220799 | A1* | 7/2023 | Shinde ..................... F02C 7/32 |
| | | | 60/226.1 |
| 2025/0283432 | A1* | 9/2025 | Ross ...................... F02C 7/232 |

FOREIGN PATENT DOCUMENTS

| | | |
|---|---|---|
| EP | 3569842 B1 | 5/2023 |

OTHER PUBLICATIONS

Extended European Search Report dated Feb. 6, 2026, for corresponding European Patent Application No. 25201094.7, 6 pgs.

* cited by examiner

*Primary Examiner* — Katheryn A Malatek
(74) *Attorney, Agent, or Firm* — Kinney & Lange, P.A.

(57) ABSTRACT

A gas turbine engine includes an engine core with a compressor section, a combustion section downstream of the compressor section relative to a core flow path, and a turbine section downstream of the combustion section relative to the core flow path. A core casing extends around the compressor section, the combustion section, and the turbine section. A second casing extends around the core casing and a core compartment is between the core casing and the second casing. An electric compressor is in the core compartment. A first port is formed in the second casing and fluidically is connected to the electric compressor. A second port is formed in the core casing in the combustion section and is fluidically connected to the electric compressor.

19 Claims, 4 Drawing Sheets

ACTIVE THERMAL MANAGEMENT OF FUEL SYSTEMS AND FUEL NOZZLES FOR MORE ELECTRIC ENGINES

BACKGROUND

The present disclosure relates to gas turbine engines and, more particularly, to reducing coking in a fuel system of the gas turbine engine.

A gas turbine engine includes fuel nozzles that inject fuel into a combustor of the gas turbine engine. During operation, fuel flow through the fuel nozzles of the fuel system is used to thermally condition the nozzles and prevent coking from occurring in the nozzles and neighboring fuel lines. At shutdown of a gas turbine engine, fuel flow is halted and heat from the combustor and case structure soaks into the fuel system, which can lead to coking in the fuel system. Coke buildup compromises fuel nozzle performance and drives maintenance.

SUMMARY

In one example of the disclosure, a gas turbine engine includes an engine core with a compressor section, a combustion section downstream of the compressor section relative to a core flow path, and a turbine section downstream of the combustion section relative to the core flow path. A core casing extends around the compressor section, the combustion section, and the turbine section. A second casing extends around the core casing. A core compartment is between the core casing and the second casing and an electric compressor is in the core compartment. A first valve is in the core compartment and is fluidically connected to an inlet of the electric compressor. A first port is formed in the second casing and is fluidically connected to the first valve. A bleed line fluidically connects the first valve to the core flow path proximate the compressor section. A second port is formed in the core casing in the combustion section and is fluidically connected to a combustion chamber of the combustion section. A second valve is in the core compartment and is fluidically connected to an outlet of the electric compressor. A turbine cooling line fluidically connects the second valve to at least one turbine cooling passage in the turbine section. A ventilation line fluidically connects the second valve to the second port.

In another example of the disclosure, a gas turbine engine includes an engine core with a core flow path extending through the engine core, a compressor section forming an inlet of the core flow path, a combustion section downstream of the compressor section relative to the core flow path, and a turbine section downstream of the combustion section relative to the core flow path. A core casing extends around the combustion section and a nacelle casing extends around the core casing. A core compartment is between the core casing and the nacelle casing, and an electric compressor is in the core compartment. A first valve is fluidically connected to an inlet of the electric compressor and a second valve is fluidically connected to an outlet of the electric compressor. A first port extends through the nacelle casing and is fluidically connected to the first valve. A bleed line fluidically connects the first valve to the core flow path proximate the compressor section. A second port extends through the core casing in the combustion section. A ventilation line fluidically connects the second valve to the second port. A turbine cooling line fluidically connects the second valve to at least one turbine cooling passage in the turbine section.

In another example of the disclosure, a method is disclosed for cooling a gas turbine engine. The method includes cooling a turbine section of the gas turbine engine with an electric compressor operating in a first mode. The electric compressor operating in the first mode includes fluidically connecting an inlet of the electric compressor to a bleed line in fluid communication with a compressor section of the gas turbine engine, fluidically connecting an outlet of the electric compressor to at least one cooling passage in the turbine section of the gas turbine engine, and pumping air from the compressor section to the at least one cooling passage in the turbine section by the electric compressor. The method also includes cooling a combustion section of the gas turbine engine with the electric compressor operating in a second mode. The electric compressor operating in the second mode includes fluidically connecting the inlet of the electric compressor to a first port in fluid communication with a bypass flow path of the gas turbine engine, fluidically connecting the outlet of the electric compressor to a second port in fluid communication with the combustion section, and pumping air from the bypass flow path to the combustion section by the electric compressor to cool the combustion section.

Figure 1:
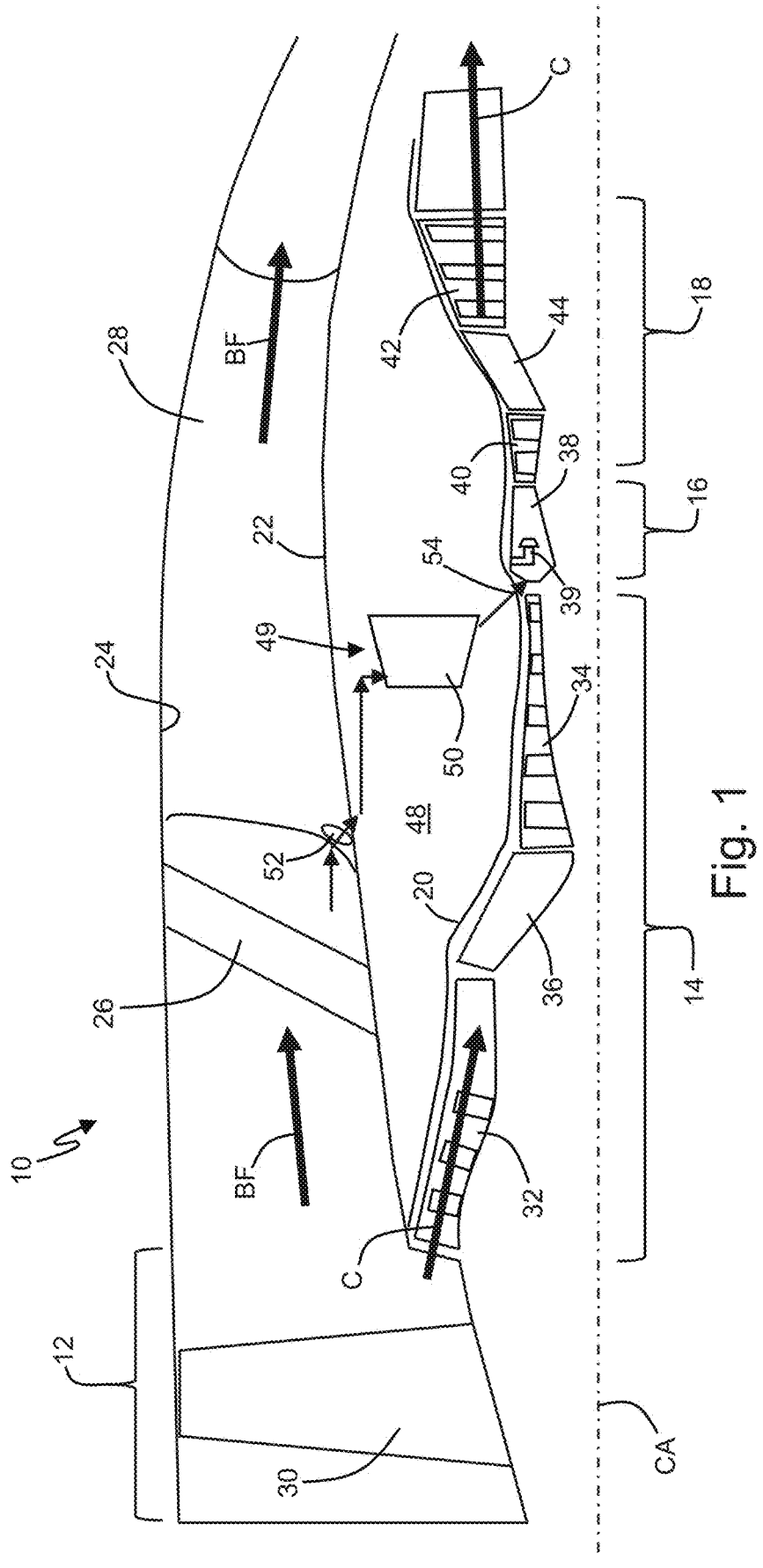
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a gas turbine engine with an electrically powered compressor positioned within a core compartment between a core casing and an inner nacelle casing of the gas turbine engine. During regular operation of the gas turbine engine, the electrically powered compressor can direct air from the bypass flow path to a turbine section of the gas turbine engine to cool the turbine section. At shutdown of the gas turbine engine and post shutdown of the gas turbine engine, the electrically powered compressor can direct air from the bypass flow path (or from another location external to the core casing) to a combustion section of the gas turbine engine to cool the combustion section and to cool fuel injectors, nozzles, and manifolds in the combustion section. Cooling the combustion section during and/or after shutdown of the gas turbine engine helps prevent fuel remaining in the fuel injectors, nozzles, and manifolds from overheating and forming coke. Mitigating coke formation in the fuel injectors, nozzles, and manifolds maintains intended fuel injector performance in the combustion section, which results in improved reliability and time on wing of the gas turbine engine. The gas turbine engine is discussed below with reference to the figures.

FIG. 1 is a quarter-sectional view that schematically illustrates an example gas turbine engine 10. Although the disclosed non-limiting embodiment depicts gas turbine engine 10 as a turbofan gas turbine engine, it should be understood that the concepts described herein are not limited to use with turbofans as the teachings may be applied to other types of turbine engines; for example, an industrial gas turbine; an open rotor gas turbine engine; a reverse-flow gas turbine engine; and a turbine engine including a three-spool architecture in which three spools concentrically rotate about center axis CA of gas turbine engine 10 where a low spool enables a low pressure turbine to drive a fan or open rotor via a gearbox, an intermediate spool that enables an intermediate pressure turbine to drive a first compressor of the compressor section, and a high spool that enables a high pressure turbine to drive a high pressure compressor of the compressor section.

In the example of FIG. 1, gas turbine engine 10 includes fan section 12, compressor section 14, combustion section 16, turbine section 18, core casing 20, inner nacelle casing 22, outer nacelle casing 24, fan exit guide vane 26, and nacelle bifurcation 28. Fan section 12 includes fan blades 30. Compressor section 14 includes low-pressure compressor 32, high-pressure compressor 34, and compressor frame 36. Combustion section 16 includes combustion chamber 38 and fuel injectors 39. Turbine section 18 includes high-pressure turbine 40, low-pressure turbine 42, and mid-turbine frame 44. Gas turbine engine 10 further includes core compartment 48 and cooling system 49. Cooling system 49 includes electric compressor 50, first port 52, and second port 54.

Fan section 12 is upstream of both core flow path C and bypass flow path BF. Compressor section 14, combustion section 16, and turbine section 18 form core flow path C that extends axially aft of fan section 12 relative to center axis CA. Core casing 20 extends circumferentially around compressor section 14, combustion section 16, and turbine section 18. Core casing 20 can include a plurality of casing segments that are assembled together to form core casing 20. Inner nacelle casing 22 extends circumferentially around core casing 20. In the example of FIG. 1, inner nacelle casing 22 forms a radially inner flow surface of bypass flow path BF. Outer nacelle casing 24 extends circumferentially around inner nacelle casing 22 and is spaced radially from inner nacelle casing 22 relative to center axis CA. Outer nacelle casing 24 forms a radially outer flow surface of bypass flow path BF. Together, inner nacelle casing 22 and outer nacelle casing 24 form a bypass duct that defines bypass flow path BF. Fan exit guide vane 26 is downstream of fan section 12 in bypass flow path BF and can extend from inner nacelle casing 22 to outer nacelle casing 24. Nacelle bifurcation 28 can be downstream of fan exit guide vane 26 and can extend from inner nacelle casing 22 to outer nacelle casing 24. Both fan exit guide vane 26 and nacelle bifurcation 28 can help guide flow in bypass flow path BF and provide structural support to gas turbine engine 10. At least a portion of inner nacelle casing 22 is spaced radially from core casing 20 relative to center axis CA to form core compartment 48 between core casing 20 and inner nacelle casing 22.

As used herein, a "high-pressure" compressor or turbine experiences a higher pressure than a corresponding "low-pressure" compressor or turbine. In the example of FIG. 1, low-pressure compressor 32 is upstream of high-pressure compressor 34 relative to core flow path C. Compressor frame 36 fluidically connects low-pressure compressor 32 to high-pressure compressor 34 and can also provide static structural support for gas turbine engine 10. Combustion chamber 38 is downstream of high-pressure compressor 34. Fuel injectors 39 extend into combustion chamber 38 and are connected to a fuel system (not shown) to introduce and diffuse fuel into the combustion chamber during operation of gas turbine engine 10. High-pressure turbine 40 is downstream of combustion chamber 38, and low-pressure turbine 42 is downstream of high-pressure turbine 40. Mid-turbine frame 44 forms a portion of core flow path C that fluidically connects high-pressure turbine 40 to low-pressure turbine 42. Similar to compressor frame 36, mid-turbine frame 44 also provides static structural support for gas turbine engine 10.

In the example gas turbine engine 10 shown in FIG. 1, low-pressure turbine 42 is mechanically connected to low-pressure compressor 32 and fan section 12 such that rotation of low-pressure turbine 42 drives rotation of fan section 12 and low-pressure compressor 32. High-pressure turbine 40 is mechanically connected to high-pressure compressor 34 such that rotation of high-pressure turbine 40 drives rotation of high-pressure compressor 34. During operation of gas turbine engine 10, rotation of fan blades 30 in fan section 12 draws air into gas turbine engine 10 and drives most of the air through bypass flow path BF to propel the gas turbine engine 10. Low-pressure compressor 32 draws a portion of the air into core flow path C where that portion of the air is compressed by low-pressure compressor 32 and high-pressure compressor 34 before the air is directed into combustion chamber 38. In combustion chamber 38, fuel injectors 39 mix fuel into the compressed air and the fuel-air mixture is ignited to produce high-pressure exhaust gases. The high-pressure exhaust gases are directed from combustion chamber 38 into high-pressure turbine 40. As the high-pressure exhaust gases pass and expand through high-pressure turbine 40, high-pressure turbine 40 extracts power from the high-pressure exhaust gases to drive high-pressure compressor 34. After passing through high-pressure turbine 40, the high-pressure exhaust gases pass through low-pressure turbine 42. As the high-pressure exhaust gases pass and expand through low-pressure turbine 42, low-pressure turbine 42 extracts power from the high-pressure exhaust gases to drive low-pressure compressor 32 and fan section 12.

During operation of gas turbine engine 10, combustion section 16 generates a significant amount of heat. The flow of fuel through fuel injectors 39 generally keeps fuel injectors 39 and the rest of the fuel system (not shown) cool enough to prevent coking of the fuel during operation of gas turbine engine 10. Cooling system 49 can cool combustion section 16, fuel injectors 39, and any other part of the fuel system near combustion section 16 (such as fuel manifold lines) during shutdown of gas turbine engine 10, and during post shutdown of gas turbine engine 10. Generally cooling system 49 can cool fuel injectors 39, combustion chamber 38, high-pressure turbine 40 and rear stages of high-pressure compressor 34 as needed when the engine is off. As shown in the example of FIG. 1, electric compressor 50 of cooling system 49 is positioned within core compartment 48 between core casing 20 and inner nacelle casing 22. Electric compressor 50 is an electrically powered compressor that is integrated into a high voltage electrical network (not shown)

and may be driven off engine generator power and/or aircraft electrical power. Electric compressor 50 may alternatively be powered off an aircraft battery (not shown) or airport ground carts for engine shutdown. First port 52 is formed in inner nacelle casing 22 and is fluidically connected to electric compressor 50. In the example of FIG. 1, first port 52 is fluidically connected to an inlet of electric compressor 50 such that electric compressor 50 can draw air from bypass flow path BF. Second port 54 is formed in core casing 20 and is fluidically connected to electric compressor 50. In the example of FIG. 1, second port 54 is fluidically connected to an outlet of electric compressor 50 such that electric compressor 50 can direct air from bypass flow path BF to combustion chamber 38 and fuel nozzles 39.

During shutdown, and post shutdown of gas turbine engine 10, the air from bypass flow path BF communicated by electric compressor 50 to second port 54 cools combustion chamber 38, fuel injectors 39, and/or fuel supply lines and manifolds proximate to combustion section 16. By cooling combustion chamber 38, and fuel injectors 39, electric compressor 50 prevents any fuel remaining in fuel injectors 39 and nearby fuel lines and manifolds from overheating and generating fuel coke that could clog or interfere with the fuel system and fuel injectors 39. Cooling system 39 is described in greater detail below with reference to FIGS. 2 and 3.

Figure 2:
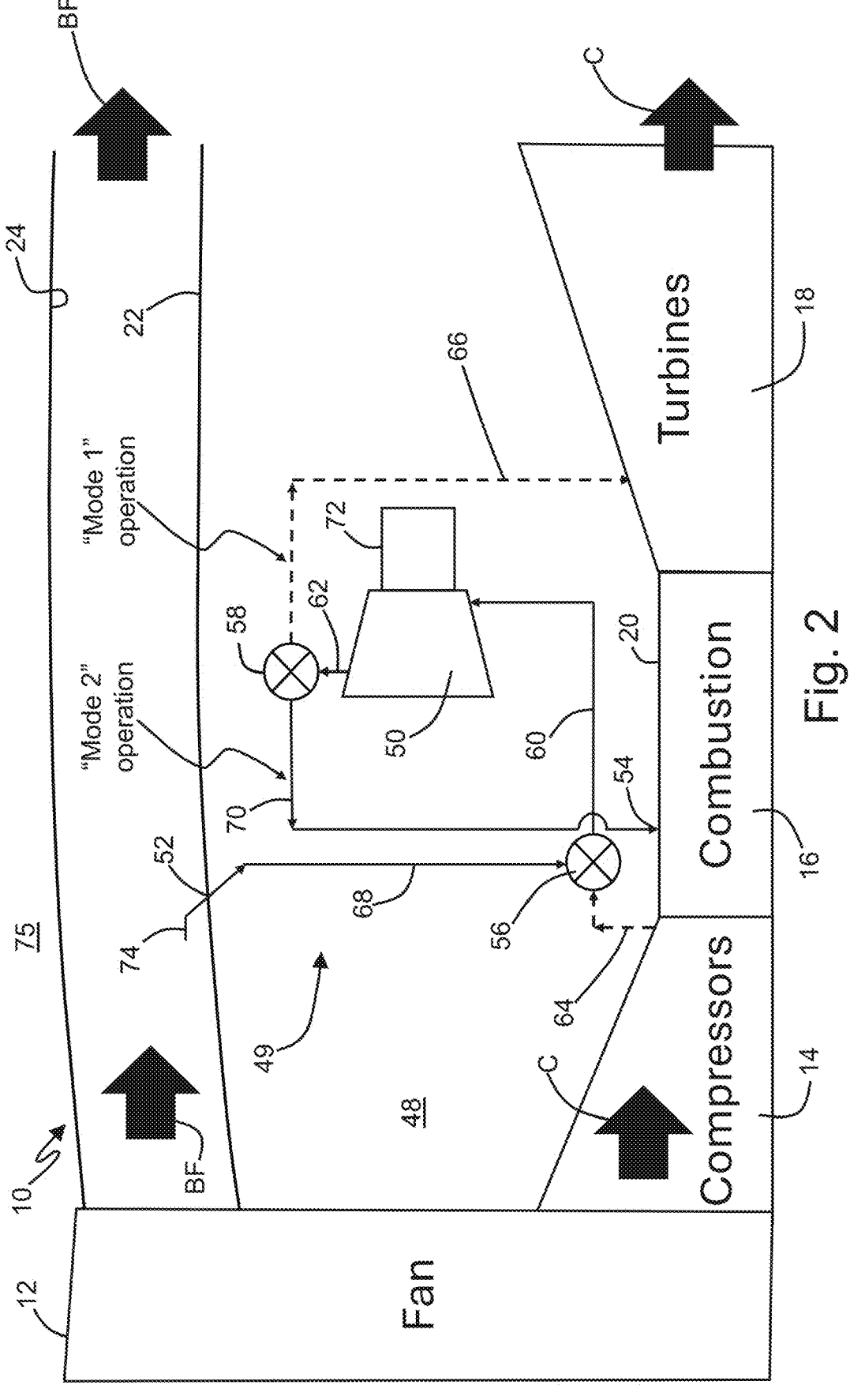
FIG. 2 is a simplified schematic diagram of the gas turbine engine of FIG. 1 showing an embodiment of an electrically powered cooling system.

FIG. 2 is a schematic diagram of gas turbine engine 10 showing an example of cooling system 49. In the example of FIG. 2, cooling system 49 further includes first valve 56, second valve 58, inlet line 60, outlet line 62, bleed line 64, turbine cooling line 66, supply line 68, fuel system ventilation line 70, electric motor 72, and air scoop 74.

In the example of FIG. 2, electric compressor 50 is in core compartment 48 between inner nacelle case 22 and core case 20. Electric compressor 50 includes electric motor 72 that drives electric compressor 50. In some examples, electric motor 72 can be a variable speed electric motor that allows electric compressor to have a variable flowrate and output pressure. In other examples, for simplicity, electric motor 72 can be a single speed electric motor that is sized to meet the maximum requirements of electric compressor 50. Electric motor 72 can be integrated into a high voltage electrical network (not shown) and may be driven off engine generator power and/or aircraft electrical power. Alternatively, electric motor 72 may be integrated into a low voltage electrical network (not shown). Electric motor 72 may alternatively be powered off an aircraft battery (not shown) or airport ground carts for engine shutdown. Electronic controller 75 can be in electrical communication with electric motor 72 to control an output flowrate and pressure of electric compressor 50. Electronic controller 75 can be an electronic engine control (EEC) and/or a full authority digital engine control (FADEC) of gas turbine engine 10, or electronic controller 75 can be a controller that is separate from the EEC and FADEC and specific to cooling system 49.

Inlet line 60 fluidically connects first valve 56 to an inlet of electric compressor 50. First valve 56 can be an electrically controlled actuated valve, such as a solenoid valve, a switching valve, or an electrohydraulic servo valve. First valve 56 is fluidically connected to bleed line 64 and supply line 68 and can selectively connect inlet line 60 to bleed line 64 or supply line 68 in response to a command signal from electronic controller 75. Bleed line 64 fluidically connects first valve 56 to compressor section 14 or to a diffuser section positioned axially between compressor section 14 and combustion section 16. Bleed line 64 fluidically communicates with core flow path C in compressor section 14 through core casing 20. Supply line 68 fluidically connects first valve 56 to first port 52. As previously discussed with reference to FIG. 1, first port 52 fluidically communicates with bypass flow path BF through inner nacelle case 22. Air scoop 74 can be formed on inner nacelle case 22 to help guide airflow into first port 52.

Outlet line 62 fluidically connects second valve 58 to an outlet of electric compressor 50. Second valve 58 can also be an electrically controlled and actuated valve, such as a solenoid valve, a switching valve, or an electrohydraulic servo valve. In some examples, first valve 56 and second valve 58 can both be controlled by a single valve actuator that actuates second valve 58 simultaneously with first valve 56. In other examples, first valve 56 and second valve 58 can be integrated into a single component controlled by a valve actuator that actuates second valve 58 simultaneously with first valve 56. Second valve 58 is fluidically connected to turbine cooling line 66 and fuel system ventilation line 70 and can selectively connect outlet line 62 to turbine cooling line 66 or fuel system ventilation line 70 in response to a command signal from electronic controller 75. Turbine cooling line 66 fluidically connects second valve 58 to turbine section 18. Turbine cooling line 66 fluidically communicates with a network of cooling passages in the components of turbine section 18 through core casing 20. Fuel system ventilation line 70 fluidically connects second valve 58 to second port 54. As previously discussed with reference to FIG. 1, second port 54 fluidically communicates with combustion chamber 38 through core case 20.

During a flight phase of gas turbine engine 10, electronic controller 75 can command cooling system 49 to switch to a "first mode." In the first mode of cooling system 49, first valve 56 fluidically connects inlet line 60 to bleed line 64 and second valve 58 fluidically connects outlet line 62 to turbine cooling line 66. With inlet line 60 fluidically connected to bleed line 64 and outlet line 62 fluidically connected to turbine cooling line 66, electric compressor 50 can source cooling air from the core flow path C in compressor section 14, compress the cooling air, and direct the compressed cooling air to turbine section 18 to cool the components of turbine section 18. The flight phase of gas turbine engine 10 and the first mode of cooling system 49 occurs during ground idle, taxiing in, taxiing out, take-off, ascent, cruise, descent, and landing of the aircraft carrying gas turbine engine 10. During the flight phase of gas turbine engine 10, the flow of fuel through combustion section 16 helps keep fuel injectors 39 and the fuel lines and manifolds supplying fuel injectors 39 cool enough to prevent fuel coking therein.

During shutdown and post shutdown of gas turbine engine 10, there is no flow of fuel through fuel injectors 39, and passive cooling in combustion section 16 may be insufficient alone to keep the fuel in and near combustion section 16 cool enough to avoid fuel coking. Thus, when the when gas turbine engine 10 is shutting down and during post shutdown of gas turbine engine 10, electronic controller 75 can command cooling system 49 to switch to a "second mode."

In the second mode of cooling system 49, first valve 56 fluidically connects inlet line 60 to supply line 68 and second valve 58 fluidically connects outlet line 62 to fuel system ventilation line 70. With inlet line 60 fluidically connected to supply line 68 and outlet line 62 fluidically connected to fuel system ventilation line 70, electric compressor 50 can source cooling air from the bypass flow path BF and direct the cooling air to combustion section 16 to actively cool fuel injectors 39 and combustion chamber 38. Fuel lines and manifolds around combustor section 16 may be conductively cooled as the core flow path C is cooled. As the gas turbine engine 10 is shut down, the pressure within core flow path C is at or near ambient pressure. Electronic controller 75 can adjust the speed of electric motor 72 such that electric compressor 50 is providing sufficient cooling flow to combustion section 16 to prevent fuel coking, but at a much lower pressure than the pressures supplied by electric compressor 50 while operating in the first mode. By operating at a lower speed and lower output pressure, electric compressor 50 conserves electrical power, which is especially useful in the scenario where cooling system 49 is operating on battery power after shutdown of gas turbine engine 10. Electronic controller 75 can also actively manage cooling system 49 and adjust the output pressure and flowrate of electric compressor 50 as a function of outside air temperature and the temperature of combustion section 16. For example, on hot day landings, electronic controller 75 can increase power to electric compressor 50 so that electric compressor 50 can increase flow to combustion section 16. On cold day landings, electronic controller 75 can relatively decrease power to electric compressor 50 to decrease flow to combustion section 16.

Figure 3:
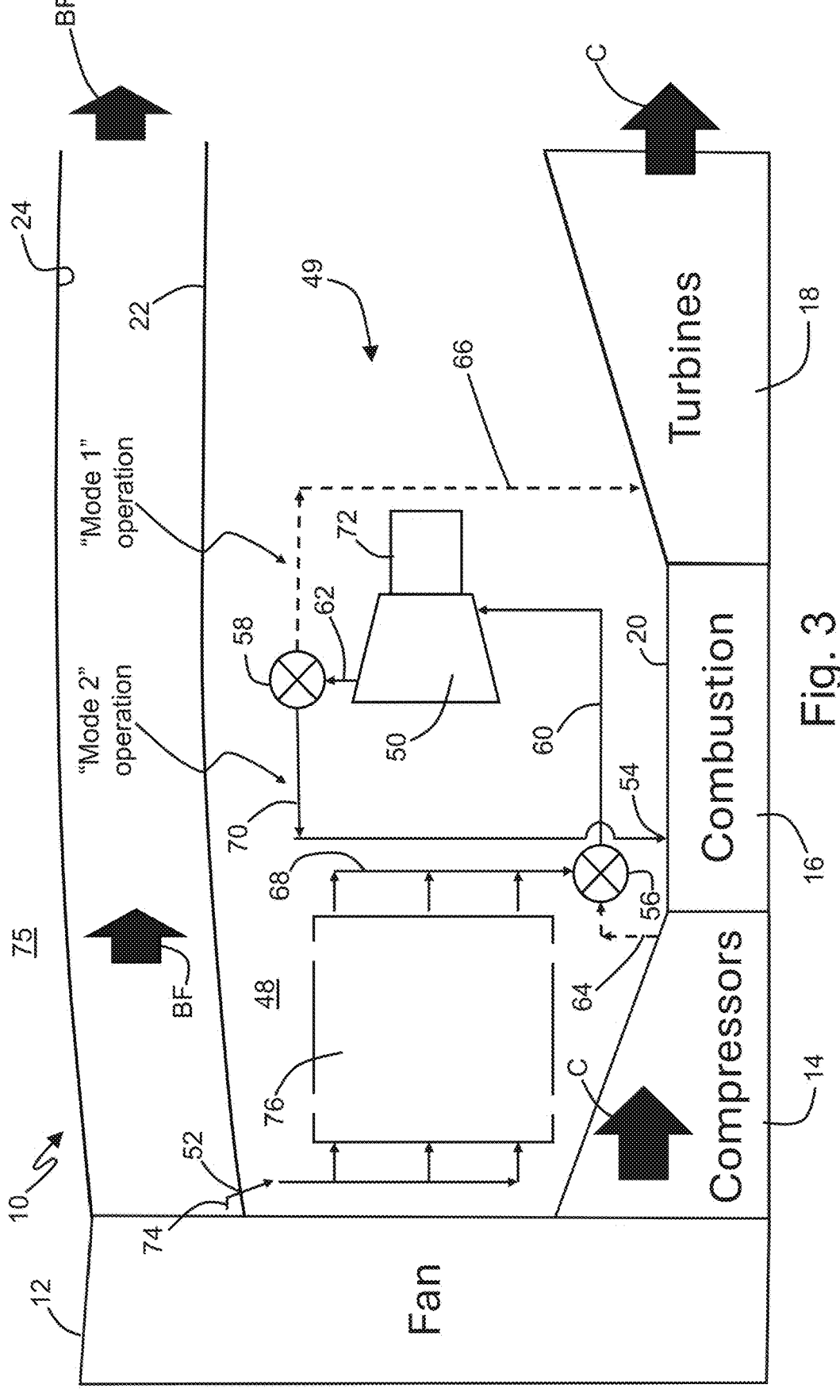
FIG. 3 is a simplified schematic diagram of the gas turbine engine of FIG. 1 showing another embodiment of an electrically powered cooling system.

FIG. 3 is a schematic diagram of gas turbine engine 10 showing another example of cooling system 49. In the example of FIG. 3, cooling system 49 further includes mixing volume 76. Mixing volume 76 can be an annulus that extends circumferentially about center axis CA within inner nacelle casing 22. Mixing volume 76 fluidically connects first port 52 to supply line 68 and is fluidically separate from core compartment 48. When the example of cooling system 49 shown in FIG. 3 is in the second mode, electric compressor 50 draws air from bypass flow path BF into mixing volume 76, through supply line 68, through first valve 56, through inlet line 60, into outlet line 62, through second valve 58, through fuel system ventilation line 70, and through second port 54 to combustion section 16. As electric compressor 50 pulls air from bypass flow path BF and core compartment 48 into mixing volume 76 and pushes the air to combustion section 16, electric compressor 50 not only cools and ventilates combustion section 16 but also cools and ventilates core compartment 48 and any components within core compartment 48, including electric compressor 50. In some examples, a plurality of first ports 52 can be formed and circumferentially distributed in inner nacelle casing 22 to ease and increase the flow of air from bypass flow path BF into core compartment 48 while cooling system 49 is operating in the second mode. In some examples, mixing volume can include additional inlets to draw air from the core compartment 48.

Figure 4:
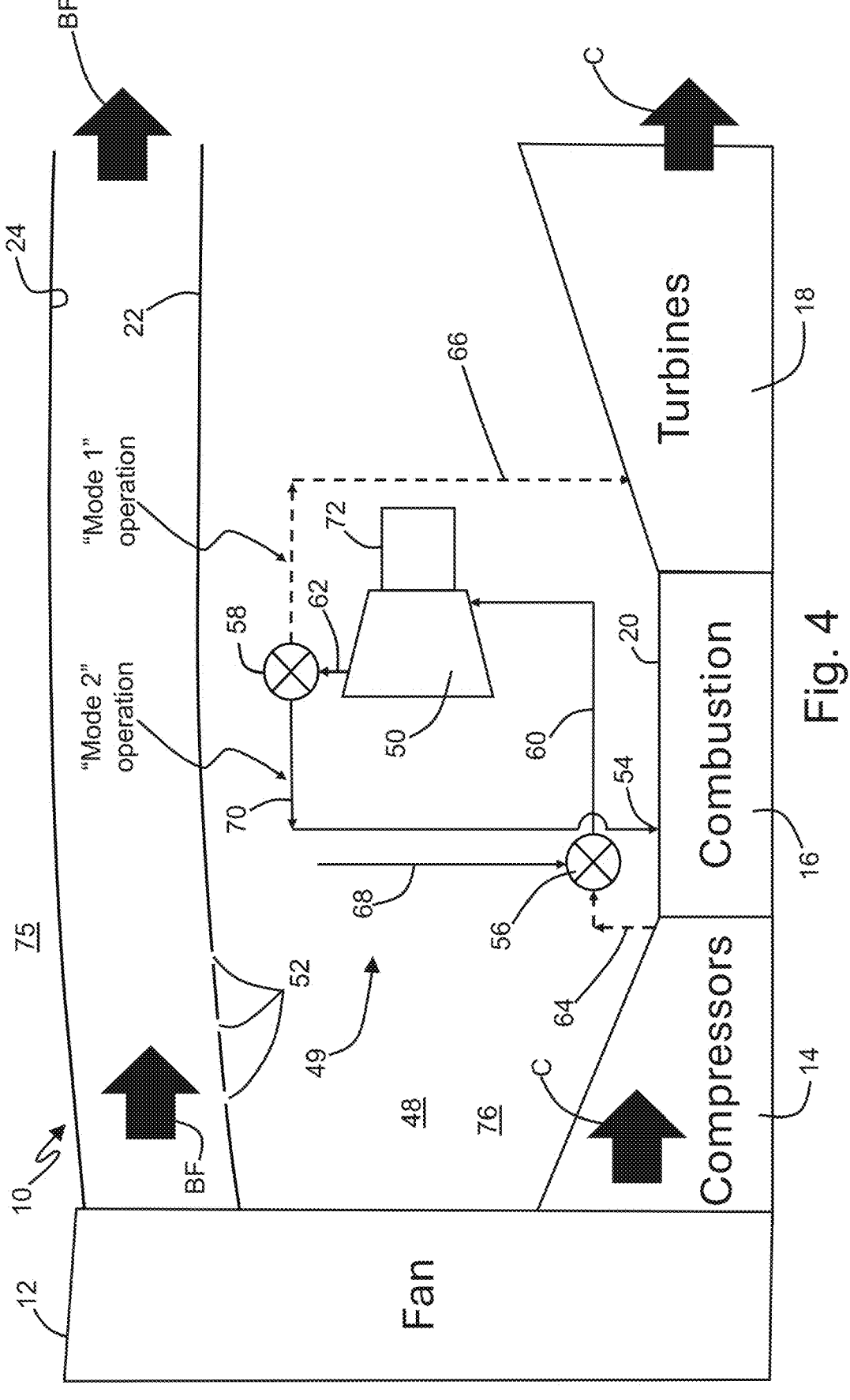
FIG. 4 is a simplified schematic diagram of the gas turbine engine of FIG. 1 showing another embodiment of an electrically powered cooling system.

FIG. 4 is a schematic diagram of gas turbine engine 10 showing another example of cooling system 49. In the example of FIG. 4, core compartment 48 itself forms a mixing annulus. An inlet of supply line 68 can be fluidically open to core compartment 48 and a plurality of first ports 52 can be formed in inner nacelle case 22 to fluidically connect core compartment 48 to bypass flow path BF. The inlet of supply line 68 may include a plurality of inlets that are located circumferentially about the core compartment 48 or may be limited to one sector such as top dead center to locally promote increased circulation within core compartment 48. In other examples, the plurality of first ports 52 can be substituted by a plurality of gaps formed in inner nacelle case 22. In this example, air scoop 74 is omitted from cooling system 49 to reduce drag in bypass flow path BF. In some examples, the plurality of first ports 52 can be circumferentially distributed in inner nacelle casing 22 to ease and increase the flow of air from bypass flow path BF into core compartment 48 while cooling system 49 is operating in the second mode. In some examples, a means to block first ports 52 may be incorporated while cooling system 49 is operating in the first mode.

When the example of cooling system 49 shown in FIG. 4 is in the second mode, electric compressor 50 draws air directly from core compartment 48 into supply line 68, through first valve 56, through inlet line 60, into outlet line 62, through second valve 58, through fuel system ventilation line 70, and through second port 54 to combustion section 16. As electric compressor 50 pulls air from core compartment 48 into combustion section 16, air is pulled from bypass flow path BF into core compartment 48 through the plurality of first ports 52 to replenish the air in core compartment 48 and cool core compartment 48. In this manner, electric compressor 50 not only cools and ventilates combustion section 16 but also cools and ventilates core compartment 48 and any components within core compartment 48, including electric compressor 50.

As discussed above with reference to FIGS. 1-4, cooling system 49 provides several benefits and advantages. While operating in the first mode, cooling system 49 can provide cooling to turbine section 18 while gas turbine engine 10 is operating during a flight phase of an aircraft. In a second mode, cooling system 49 can cool and ventilate combustion section 16 and core compartment 48 using ambient air from bypass flow path BF. Since cooling system 49 uses electric compressor 50 to drive cooling system 49, cooling system 49 is not dependent on mechanical or hydraulic power from gas turbine engine 10 and can cool combustion section 16 after gas turbine engine 10 is completely powered down. As an electrical system, cooling system 49 can be directly controlled by an EEC or FADEC of an aircraft and can be actively managed to adjust system power levels of cooling system 49 as a function of outside air temperature and combustion section temperature.

Discussion of Possible Embodiments

The following are non-exclusive descriptions of possible embodiments of the present invention.

In one aspect of the disclosure, a gas turbine engine includes an engine core with a compressor section, a combustion section downstream of the compressor section relative to a core flow path, and a turbine section downstream of the combustion section relative to the core flow path. A core casing extends around the compressor section, the combustion section, and the turbine section. A second casing extends around the core casing. A core compartment is between the core casing and the second casing and an electric compressor is in the core compartment. A first valve is in the core compartment and is fluidically connected to an inlet of the electric compressor. A first port is formed in the second casing and is fluidically connected to the first valve. A bleed line fluidically connects the first valve to the core flow path proximate the compressor section. A second port is formed in the core casing in the combustion section and is fluidically connected to a combustion chamber of the combustion section. A second valve is in the core compartment and is fluidically connected to an outlet of the electric compressor. A turbine cooling line fluidically connects the second valve to at least one turbine cooling passage in the turbine section. A ventilation line fluidically connects the second valve to the second port.

The gas turbine engine of the preceding paragraph can optionally include, additionally and/or alternatively, any one or more of the following features, configurations and/or additional components in the paragraphs below.

In an embodiment of the gas turbine engine, the first valve is open to the bleed line and closed to the first port in a first mode of the gas turbine engine, the second valve is open to the turbine cooling line and closed to the ventilation line in the first mode of the gas turbine engine, the first valve is open to the first port and closed to the bleed line in a second mode of the gas turbine engine, and the second valve is open to the ventilation line and closed to the turbine cooling line in the second mode of the gas turbine engine.

In an embodiment of the gas turbine engine, the first valve is an electrically actuated valve, and the second valve is an electrically actuated valve.

In an embodiment of the gas turbine engine, the gas turbine engine further comprises an electronic controller in communication with the electric compressor, the first valve, and the second valve.

In an embodiment of the gas turbine engine, the electric compressor comprises an electric motor in the core compartment and configured to drive the electric compressor.

In an embodiment of the gas turbine engine, the first valve and the second valve are integrated into a single component comprising a single valve actuator that actuates the second valve simultaneously with the first valve.

In an embodiment of the gas turbine engine, the gas turbine engine further comprises a mixing annulus in the core compartment and extending circumferentially about a center axis of the gas turbine engine, wherein the mixing annulus fluidically connects the first port to the first valve, and wherein the mixing annulus fluidically connects the first valve to the core compartment.

In an embodiment of the gas turbine engine, the core compartment fluidically connects the first valve to the first port.

In another aspect of the disclosure, a gas turbine engine includes an engine core with a core flow path extending through the engine core, a compressor section forming an inlet of the core flow path, a combustion section downstream of the compressor section relative to the core flow path, and a turbine section downstream of the combustion section relative to the core flow path. A core casing extends around the combustion section and a nacelle casing extends around the core casing. A core compartment is between the core casing and the nacelle casing, and an electric compressor is in the core compartment. A first valve is fluidically connected to an inlet of the electric compressor and a second valve is fluidically connected to an outlet of the electric compressor. A first port extends through the nacelle casing and is fluidically connected to the first valve. A bleed line fluidically connects the first valve to the core flow path proximate the compressor section. A second port extends through the core casing in the combustion section. A ventilation line fluidically connects the second valve to the second port. A turbine cooling line fluidically connects the second valve to at least one turbine cooling passage in the turbine section.

The gas turbine engine of the preceding paragraph can optionally include, additionally and/or alternatively, any one or more of the following features, configurations and/or additional components in the paragraphs below.

In an embodiment of the gas turbine engine, the gas turbine engine further comprises a bypass flow path radially outward of the nacelle casing, wherein the first port fluidically connects to the bypass flow path.

In an embodiment of the gas turbine engine, the first valve is open to the bleed line and closed to the first port in a first mode of the gas turbine engine, the second valve is open to the turbine cooling line and closed to the ventilation line in the first mode of the gas turbine engine, the first valve is open to the first port and closed to the bleed line in a second mode of the gas turbine engine, and the second valve is open to the ventilation line and closed to the turbine cooling line in the second mode of the gas turbine engine.

In an embodiment of the gas turbine engine, the first valve is an electrically actuated valve, and the second valve is an electrically actuated valve.

In an embodiment of the gas turbine engine, the gas turbine engine further comprises an electronic controller in communication with the electric compressor, the first valve, and the second valve, and wherein the electronic controller is configured to switch the first valve and the second valve from the first mode to the second mode.

In an embodiment of the gas turbine engine, the first valve and the second valve are integrated into a single component comprising a single valve actuator in communication with the electronic controller and configured to actuate the second valve simultaneously with the first valve.

In an embodiment of the gas turbine engine, the electric compressor comprises an electric motor in the core compartment and configured to drive the electric compressor, wherein the electric motor is in communication with the electronic controller.

In an embodiment of the gas turbine engine, the gas turbine engine further comprises a supply line fluidically connecting the first port to the first valve.

In an embodiment of the gas turbine engine, the gas turbine engine further comprises a mixing annulus in the core compartment, wherein the mixing annulus fluidically connects the first port to the first valve, and wherein the mixing annulus fluidically connects the first valve to the core compartment.

In an embodiment of the gas turbine engine, the core compartment fluidically connects the first valve to the first port.

In an embodiment of the gas turbine engine, the gas turbine engine further comprises a plurality of first ports extending through the nacelle casing, wherein each first port of the plurality of first ports fluidically connects the core compartment with a bypass flow path radially outward of the nacelle casing.

In another aspect of the disclosure, a method is disclosed for cooling a gas turbine engine. The method includes cooling a turbine section of the gas turbine engine with an electric compressor operating in a first mode. The electric compressor operating in the first mode includes fluidically connecting an inlet of the electric compressor to a bleed line in fluid communication with a compressor section of the gas turbine engine, fluidically connecting an outlet of the electric compressor to at least one cooling passage in the turbine section of the gas turbine engine, and pumping air from the compressor section to the at least one cooling passage in the turbine section by the electric compressor. The method also includes cooling a combustion section of the gas turbine engine with the electric compressor operating in a second mode. The electric compressor operating in the second mode includes fluidically connecting the inlet of the electric compressor to a first port in fluid communication with a bypass flow path of the gas turbine engine, fluidically connecting the outlet of the electric compressor to a second port in fluid communication with the combustion section, and pumping air from the bypass flow path to the combustion section by the electric compressor to cool the combustion section.

While the invention has been described with reference to an exemplary embodiment(s), it will be understood by those skilled in the art that various changes may be made and equivalents may be substituted for elements thereof without departing from the scope of the invention. For example, while first port 52 has been described above as a supply port or inlet for cooling system 49 and second port 54 has been described above as an outlet port for cooling system 49, in other examples, the pumping direction of electric compressor 50 can be reversed such that electric compressor 49 draws hot air from combustion section 16 through second port 54 and expels the hot air through first port 52 into the much larger and cooler volume of bypass flow path BF. As electric compressor 50 draws hot air out of combustion section 16, cooler air is drawn into combustion section 16 from fan section 12, compressor section 14, and turbine section 18. In addition, many modifications may be made to adapt a particular situation or material to the teachings of the invention without departing from the essential scope thereof. For example, while cooling system 49 has been describe as drawing air from bypass flow path BF to cool combustion section 16 while in the second mode, in other examples, cooling system 49 can draw ambient air from outside a gas turbine engine to cool combustion section 16, such as the case of a gas turbine engine with an open and un-ducted fan rotor. Therefore, it is intended that the invention not be limited to the particular embodiment(s) disclosed, but that the invention will include all embodiments falling within the scope of the appended claims.

The invention claimed is:

1. A gas turbine engine comprising:
an engine core comprising:
  a compressor section;
  a combustion section downstream of the compressor section relative to a core flow path; and
  a turbine section downstream of the combustion section relative to the core flow path;
a core casing extending around the compressor section, the combustion section, and the turbine section;
a second casing extending around the core casing;
a core compartment between the core casing and the second casing;
an electric compressor in the core compartment;
a first valve in the core compartment and fluidically connected to an inlet of the electric compressor;
a first port formed in the second casing and fluidically connected to the first valve;
a bleed line fluidically connecting the first valve to the core flow path proximate the compressor section;
a second port formed in the core casing in the combustion section and fluidically connected to a combustion chamber of the combustion section;
a second valve in the core compartment and fluidically connected to an outlet of the electric compressor;
a turbine cooling line fluidically connecting the second valve to at least one turbine cooling passage in the turbine section; and
a ventilation line fluidically connecting the second valve to the second port.

2. The gas turbine engine of claim 1, wherein:
the first valve is open to the bleed line and closed to the first port in a first mode of the gas turbine engine,
wherein the second valve is open to the turbine cooling line and closed to the ventilation line in the first mode of the gas turbine engine, wherein the first valve is open to the first port and closed to the bleed line in a second mode of the gas turbine engine, and
wherein the second valve is open to the ventilation line and closed to the turbine cooling line in the second mode of the gas turbine engine.

3. The gas turbine engine of claim 2, wherein the electric compressor comprises an electric motor in the core compartment and configured to drive the electric compressor.

4. The gas turbine engine of claim 2, wherein the first valve and the second valve are integrated into a single component comprising a single valve actuator that actuates the second valve simultaneously with the first valve.

5. The gas turbine engine of claim 2, further comprising:
a mixing annulus in the core compartment and extending circumferentially about a center axis of the gas turbine engine, wherein the mixing annulus fluidically connects the first port to the first valve, and wherein the mixing annulus fluidically connects the first valve to the core compartment.

6. The gas turbine engine of claim 2, wherein the core compartment fluidically connects the first valve to the first port.

7. The gas turbine engine of claim 1, wherein the first valve is an electrically actuated valve, and the second valve is an electrically actuated valve.

8. The gas turbine engine of claim 7, further comprising:
an electronic controller in communication with the electric compressor, the first valve, and the second valve.

9. A gas turbine engine comprising:
an engine core comprising:
  a core flow path extending through the engine core;
  a compressor section forming an inlet of the core flow path;
  a combustion section downstream of the compressor section relative to the core flow path; and
  a turbine section downstream of the combustion section relative to the core flow path;
a core casing extending around the combustion section;
a nacelle casing extending around the core casing;
a core compartment between the core casing and the nacelle casing;
an electric compressor in the core compartment;
a first valve fluidically connected to an inlet of the electric compressor;
a second valve fluidically connected to an outlet of the electric compressor;
a first port extending through the nacelle casing and fluidically connected to the first valve;
a bleed line fluidically connecting the first valve to the core flow path proximate the compressor section;
a second port extending through the core casing in the combustion section;
a ventilation line fluidically connecting the second valve to the second port; and
a turbine cooling line fluidically connecting the second valve to at least one turbine cooling passage in the turbine section.

10. The gas turbine engine of claim 9, further comprising:
a bypass flow path radially outward of the nacelle casing, wherein the first port fluidically connects to the bypass flow path.

11. The gas turbine engine of claim 9, wherein:
the first valve is open to the bleed line and closed to the first port in a first mode of the gas turbine engine, the second valve is open to the turbine cooling line and closed to the ventilation line in the first mode of the gas turbine engine, the first valve is open to the first port and closed to the bleed line in a second mode of the gas turbine engine, and the second valve is open to the ventilation line and closed to the turbine cooling line in the second mode of the gas turbine engine.

12. The gas turbine engine of claim 11, wherein the first valve is an electrically actuated valve, and the second valve is an electrically actuated valve.

13. The gas turbine engine of claim 12, further comprising:

an electronic controller in communication with the electric compressor, the first valve, and the second valve, and wherein the electronic controller is configured to switch the first valve and the second valve from the first mode to the second mode.

14. The gas turbine engine of claim 13, wherein the first valve and the second valve are integrated into a single component comprising a single valve actuator in communication with the electronic controller and configured to actuate the second valve simultaneously with the first valve.

15. The gas turbine engine of claim 13, wherein the electric compressor comprises an electric motor in the core compartment and configured to drive the electric compressor, wherein the electric motor is in communication with the electronic controller.

16. The gas turbine engine of claim 11, further comprising a supply line fluidically connecting the first port to the first valve.

17. The gas turbine engine of claim 11, further comprising:

a mixing annulus in the core compartment, wherein the mixing annulus fluidically connects the first port to the first valve, and wherein the mixing annulus fluidically connects the first valve to the core compartment.

18. The gas turbine engine of claim 17, further comprising:

a plurality of first ports extending through the nacelle casing, wherein the plurality of first ports comprises the first port, and wherein each first port of the plurality of first ports fluidically connects the core compartment with a bypass flow path radially outward of the nacelle casing.

19. The gas turbine engine of claim 11, wherein the core compartment fluidically connects the first valve to the first port.

* * * * *